(12) United States Patent  
Lu et al.

(10) Patent No.: US 9,399,403 B2
(45) Date of Patent: Jul. 26, 2016

(54) MOBILE TERMINAL, SYSTEMS AND METHODS FOR CONTROLLING CHARGING AND DISCHARGING BATTERY

(71) Applicant: BYD COMPANY LIMITED, Shenzhen, Guangdong (CN)

(72) Inventors: Han Lu, Guangdong (CN); Bin Li, Guangdong (CN)

(73) Assignee: BYD Company Limited, Shenzhen, Guangdong (CN)

( * ) Notice: Subject to any disclaimer, the term of this patent is extended or adjusted under 35 U.S.C. 154(b) by 0 days.

(21) Appl. No.: 14/523,223

(22) Filed: Oct. 24, 2014

(65) Prior Publication Data

US 2015/0042286 A1 Feb. 12, 2015

Related U.S. Application Data

(63) Continuation of application No. PCT/CN2013/074749, filed on Apr. 25, 2013.

(30) Foreign Application Priority Data

Apr. 25, 2012 (CN) .......................... 2012 1 0123391

(51) Int. Cl.
*H02J 7/00* (2006.01)
*G01R 11/56* (2006.01)
(Continued)

(52) U.S. Cl.
CPC ........... *B60L 11/184* (2013.01); *B60L 11/1842* (2013.01); *B60L 11/1848* (2013.01);
(Continued)

(58) Field of Classification Search
CPC ........ G06Q 30/0283; H02J 7/00; B60L 11/18
USPC .......................................... 320/128; 705/412
See application file for complete search history.

(56) References Cited

U.S. PATENT DOCUMENTS 7,069,028 B2 * 6/2006 Natsuno ................. G06Q 30/02
455/466
8,831,786 B2 * 9/2014 Son ..................... B60L 11/1816
320/109
(Continued)

FOREIGN PATENT DOCUMENTS

CN 201754516 U 3/2011
CN 102244401 A 11/2011
(Continued)

OTHER PUBLICATIONS

PCT International Search Report mailed Aug. 1, 2013, issued in International Application No. PCT/CN2013/074749 (4 pages).
(Continued)

*Primary Examiner* — M'Baye Diao
(74) *Attorney, Agent, or Firm* — Finnegan, Henderson, Farabow, Garrett & Dunner, LLP

(57) ABSTRACT

A method for controlling charging and discharging of a battery, as well as a server and a mobile terminal for controlling charging and discharging of a battery, are provided. The server is configured to obtain electricity pricing information, to provide the electricity pricing information to a mobile terminal, to receive an instruction from the mobile terminal to charge or discharge a battery; and to provide the instruction to a battery management device to charge or discharge the battery resource according to the instruction. The mobile terminal comprises an enquiry unit configured to send an enquiry instruction for information about electricity price to a server, a displaying unit configured to receive the information about electricity price from the server and to display the electricity pricing information; and an inputting unit configured to receive an instruction to manage a battery resource.

7 Claims, 8 Drawing Sheets

(51) Int. Cl.
  *B60L 11/18* (2006.01)
  *G06Q 50/06* (2012.01)

(52) U.S. Cl.
  CPC ............... *G06Q50/06* (2013.01); *Y02E 60/721* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

(56) References Cited

U.S. PATENT DOCUMENTS

| | | | | |
|---|---|---|---|---|
| 8,918,336 | B2* | 12/2014 | Ferro | G06Q 10/06 361/212 |
| 8,958,854 | B1* | 2/2015 | Morley | H04B 1/38 370/311 |
| 2009/0177595 | A1 | 7/2009 | Dunlap et al. | |
| 2010/0076825 | A1 | 3/2010 | Sato et al. | |
| 2010/0241716 | A1* | 9/2010 | Akadiri | H04L 69/08 709/206 |
| 2011/0178959 | A1* | 7/2011 | Nakajima | B60L 11/1824 705/412 |
| 2011/0224852 | A1 | 9/2011 | Profitt-Brown et al. | |
| 2011/0282513 | A1 | 11/2011 | Son et al. | |
| 2012/0005126 | A1* | 1/2012 | Oh | G06Q 50/06 705/412 |
| 2012/0330475 | A1* | 12/2012 | Chen | G06F 1/263 700/292 |
| 2013/0049695 | A1* | 2/2013 | Baba | H02J 3/32 320/128 |
| 2013/0311017 | A1* | 11/2013 | Matsunaga | B60L 3/00 701/22 |
| 2014/0084686 | A1* | 3/2014 | Nishibayashi | H02J 3/32 307/26 |

FOREIGN PATENT DOCUMENTS

| | | |
|---|---|---|
| CN | 102315672 A | 1/2012 |
| KR | 10-1119364 B1 | 3/2012 |
| WO | WO 2008/156735 A1 | 12/2008 |
| WO | WO 2013/159727 A1 | 10/2013 |

OTHER PUBLICATIONS

European Search Report dated Oct. 29, 2015, issued in related European Application No. EP13781718.5 (3 pages).

* cited by examiner

MOBILE TERMINAL, SYSTEMS AND METHODS FOR CONTROLLING CHARGING AND DISCHARGING BATTERY

CROSS-REFERENCE TO RELATED APPLICATIONS

This application is a continuation of International Application No. PCT/CN2013/074749, filed on Apr. 25, 2013, which claims priority to and benefits of Chinese Patent Application Serial No. 201210123391.7, filed with the State Intellectual Property Office of P. R. China on Apr. 25, 2012. The entire content of the above-referenced applications is incorporated herein by reference.

FIELD

The present disclosure relates to battery management field, and more particularly to a system and a method for controlling the charging of a battery, a system and a method for controlling the discharging of a battery, and a mobile terminal for controlling the charging and discharging of a battery.

BACKGROUND

There is a growing demand for electric vehicles which can save energy and reduce pollution. Electric vehicles are powered by battery, which need to store a huge amount of energy. The economic saving of electric vehicle can be affected by various factors. For example, in some countries, such as the United States, electricity price changes with demand for power. For example, an on-peak electricity price is typically higher than an off-peak electricity price.

Currently, companies are developing in-vehicle information management service capable of managing battery power resource, such as determining a residual electric quantity of the power battery and setting a charging time, for plug-in hybrid electric vehicle (PHEV) and electric vehicle (EV), etc. However, the information management service currently on the market does not adapt well to the power battery, and cannot efficiently manage battery power resource in an economic fashion.

SUMMARY

The present disclosure is aimed to solve at least some of the aforementioned problems.

According to a first aspect of the present disclosure, a server for management of battery resource is provided. The server is configured to acquire electricity pricing information, to provide the electricity pricing information to a mobile terminal, to receive an instruction from the mobile terminal to charge or discharge a battery, the instruction being generated according to the electricity pricing information, and to provide the instruction to a battery management device to charge or discharge the battery.

According to a second aspect of the present disclosure, a mobile terminal for management of battery resource is provided. The mobile terminal includes an enquiry unit configured to send an enquiry instruction for information about electricity price to a server, a displaying unit configured to receive the information about electricity price from the server and to display the electricity pricing information, and an inputting unit configured to receive an instruction to charge or discharge a battery and to send the instruction to the server, the instruction allowing the server to control a battery management device to charge or discharge the battery according to the instruction.

According to a third aspect of the present disclosure, a method implemented by a mobile terminal for management of battery resource is provided. The method includes sending an enquiry instruction for an electricity price to a server; obtaining the electricity price from the server and displaying the electricity price, receiving an instruction to charge or discharge a battery, the instruction being generated based on the electricity price; and sending the instruction to the server. The instruction allows the server to control a battery management device to charge or discharge the battery according to the instruction, wherein the management of battery resource includes discharging and charging of the battery.

According to a fourth aspect of the present disclosure, a method implemented by a server for management of battery resource is provided. The method comprises acquiring electricity pricing information, providing the electricity pricing information to a mobile terminal, receiving an instruction to manage a battery resource from the mobile terminal, and providing the instruction to a battery management device to manage the battery resource according to the instruction, wherein the management of battery resource includes discharging and charging of the battery.

With the system (e.g. the server and/or the mobile terminal) and the method for controlling charging the battery according to embodiments of the present disclosure, by using the enquiry unit to enquire the real-time electricity price, and using the inputting unit to charge the battery according to the real-time electricity price, the user acquires the real-time electricity price in time and charges the battery reasonably according to the real-time electricity price so as to save a charge cost. Moreover, the system and the method are easy to operate.

With the system (e.g. the server and/or the mobile terminal) and the method for controlling discharging the battery according to embodiments of the present disclosure, by using the enquiry unit to enquire the real-time electricity price, and using the inputting unit to discharge the battery according to the real-time electricity price, the user acquires the real-time electricity price in time and discharges the battery reasonably according to the real-time electricity price. Particularly, when the electricity price is relative higher, the user may discharge the battery to release the power back to a power grid, thus maximizing a benefit.

Additional aspects and advantages of the embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the disclosure will become apparent and more readily appreciated from the following descriptions taken in conjunction with the drawings in which.

DETAILED DESCRIPTION

Figure 1:
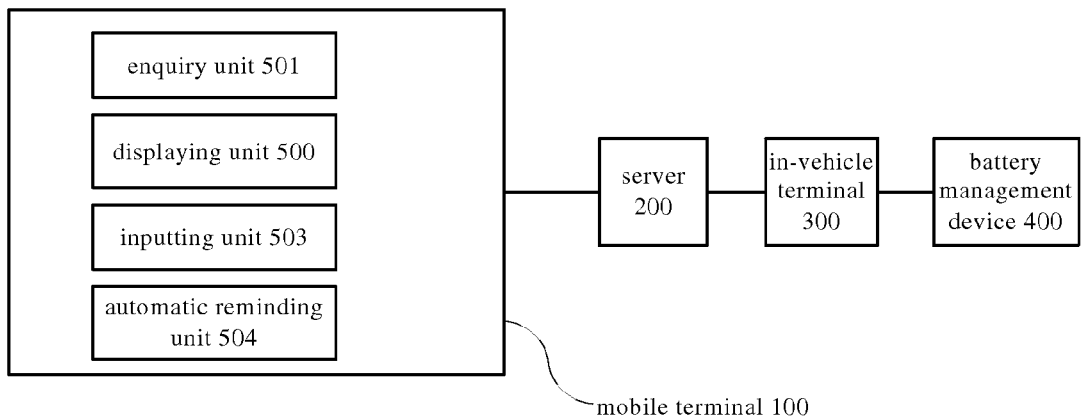
FIG. 1 is a schematic diagram of an exemplary system for controlling charging of a battery according to an embodiment of the present disclosure.

Embodiments of the present disclosure will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure. The embodiments shall not be construed to limit the present disclosure.

FIG. 1 is a schematic diagram of an exemplary system for controlling charging a battery, according to an embodiment of the present disclosure. As shown in FIG. 1, the system comprises a mobile terminal 100, a server 200 and a battery management device 400.

In some embodiments, the mobile terminal 100 includes an enquiry unit 501, a displaying unit 500 and an inputting unit 503. The enquiry unit 501 is configured to send an enquiry instruction for a real-time electricity price to the server 200. The displaying unit 500 is configured to receive the real-time electricity price returned from the server 200 and to display the real-time electricity price to the user. The inputting unit 503 is configured to receive an instruction to charge a battery from the user and to send the charging instruction to the server 200. The server 200 is configured to provide the real-time electricity price to the mobile terminal 100, and to send the charging instruction to the battery management device 400. The battery management device 400 is configured to control the charging of the battery according to the charging instruction.

In some embodiments, the battery may be an in-vehicle battery. Accordingly, the system may further include an in-vehicle terminal 300 located in an electric vehicle and capable of communicating with the server 200 and with the battery management device 400. The in-vehicle terminal 300 is configured to receive an operation instruction from the server 200 and then control the battery management device 400 to work according to the operation instruction. For example, the in-vehicle terminal 300 may receive the charging instruction from the server 200 and then control the battery management device 400 to charge the in-vehicle battery. In some embodiments, the in-vehicle terminal 300 may receive an instruction to enquire about a residual electric quantity of the in-vehicle battery from the server 200, to check the residual electric quantity of the in-vehicle battery, and to send the residual electric quantity to the server 200. Once the server 200 receives the residual electric quantity, the server 200 may determine a scheduled time for charging according to the residual electric quantity, and send the time to the displaying unit 500. In this way, the user may know a time for charging in advance.

In some embodiments, the mobile terminal 100 may comprise any mobile communication tool, such as a smart phone or a tablet PC. In some embodiments, the mobile terminal 100 may communicate with the server 200 via a wireless network. The server 200 may be operated by any wireless network communication service provider, such as a communication service provider or a network service provider. The mobile terminal 100 may communicate with the server 200 wirelessly, and the in-vehicle terminal 300 may communicate with the battery management device 400 via a control area network (CAN).

In some embodiments, the mobile terminal 100 may further comprise an automatic reminding unit 504. The automatic reminding unit 504 is configured to compare a preset low threshold price with the real-time electricity price, and to remind the user to charge the battery when the real-time electricity price is lower than the preset low threshold price.

In some embodiments, the inputting unit 503 includes a one-touch key which receives charging instruction from the user as the one-touch key is touched.

Figure 2:
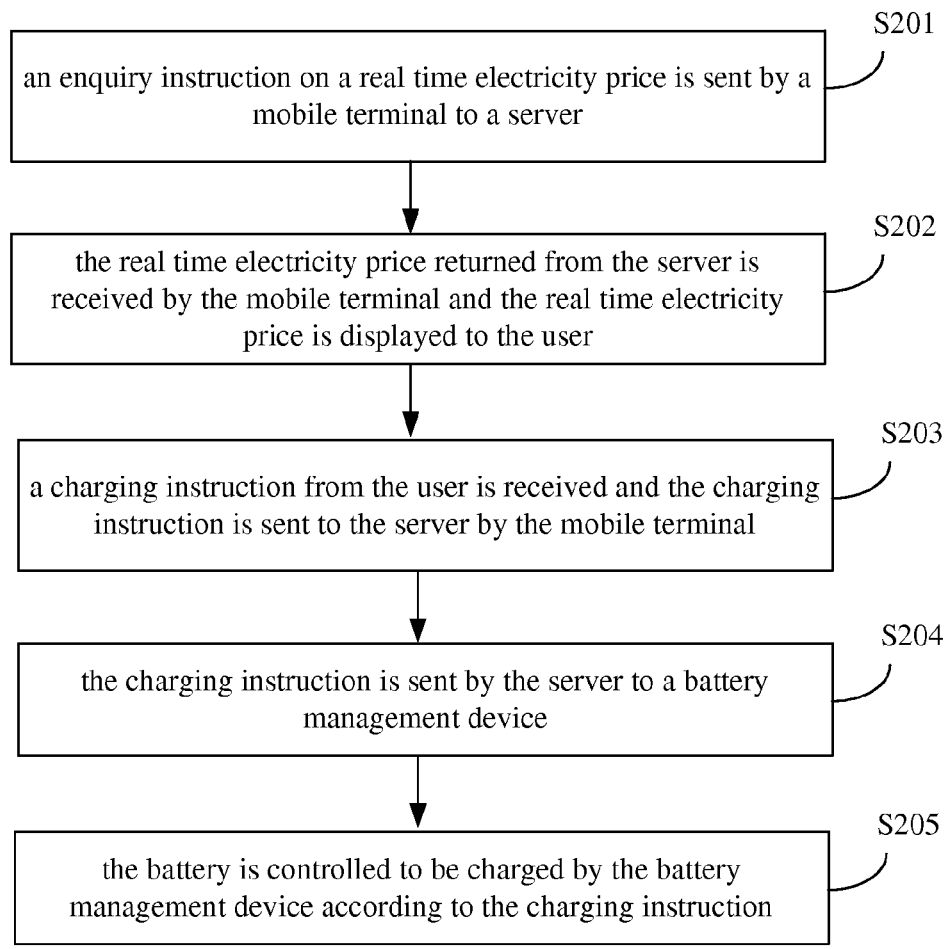
FIG. 2 is a flow chart illustrating an exemplary method for controlling charging a battery according to an embodiment of the present disclosure.

An exemplary method for controlling charging a battery according to an embodiment of a second aspect of the present disclosure is provided. As shown in FIG. 2, the method comprises the following steps.

At step S201, an enquiry instruction for a real-time electricity price is sent by a mobile terminal to a server.

At step S202, the real-time electricity price returned from the server is received by the mobile terminal, and the real-time electricity price is displayed to the user.

At step S203, a charging instruction is received from the user, and the charging instruction is sent to the server by the mobile terminal. In some embodiments, it is determined whether to charge the battery according to the real-time electricity price, if yes, the user inputs the charging instruction to the mobile terminal via an inputting unit thereof.

At step S204, the charging instruction is sent by the server to a battery management device.

At step S205, the battery is controlled to be charged by the battery management device according to the charging instruction.

In some embodiments, in order to allow the user to know a charging time in advance, the method may further comprise the following steps. The server sends an enquiry instruction for a residual electric quantity of the battery to the battery management device, receives the residual electric quantity, judges a scheduled time for charging according to the residual electric quantity, and sends the time to the mobile terminal.

In some embodiments, in order to inform the user of the charging has been terminated, the method may further comprise the following steps. The server receives a message from the battery management device, a message indicating the battery is fully charged, and sends the message to the mobile terminal.

In some embodiments, in order to facilitate the user getting the real-time electricity price, the real-time electricity price at a home location may be displayed in a highlighted mode.

Figure 3:
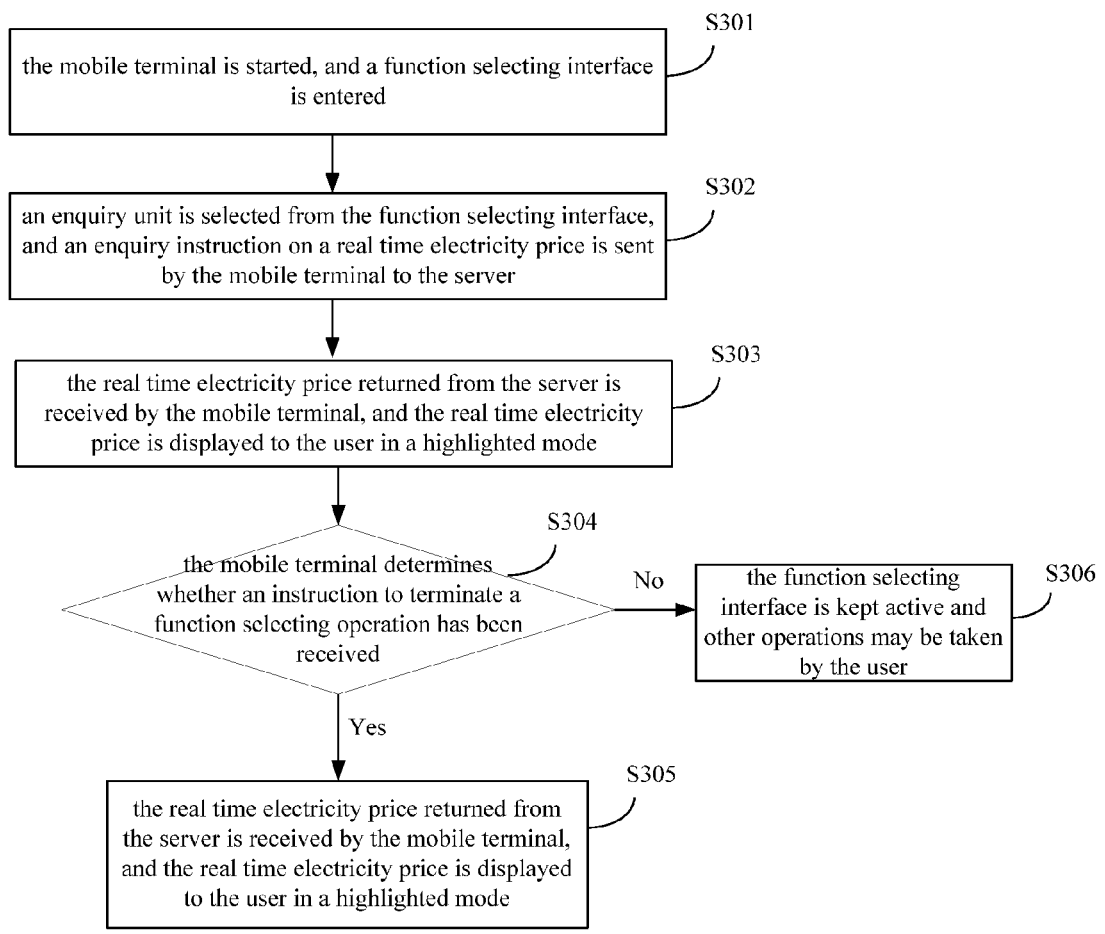
FIG. 3 is a flow chart illustrating an exemplary method of enquiry operation for controlling charging a battery according to an embodiment of the present disclosure.

FIG. 3 is a flow chart illustrating an exemplary enquiry operation according to an embodiment of the present disclosure. As shown in FIG. 3, the enquiry operation comprises following steps.

At step S301, the mobile terminal is started, and a function selecting interface is entered.

At step S302, an enquiry unit is selected from the function selecting interface, and an enquiry instruction on a real-time electricity price is sent by the mobile terminal to the server.

At step S303, the real-time electricity price returned from the server is received by the mobile terminal, and the real-time electricity price is displayed to the user in a highlighted mode.

At step S304, the mobile terminal determines whether an instruction to terminate a function selecting operation has been received. If yes, step S305 follows; if no, step S306 is follows.

At step S305, the function selecting interface is deactivated.

At step S306, the function selecting interface is kept active and other operations may be taken by the user.

Figure 4:
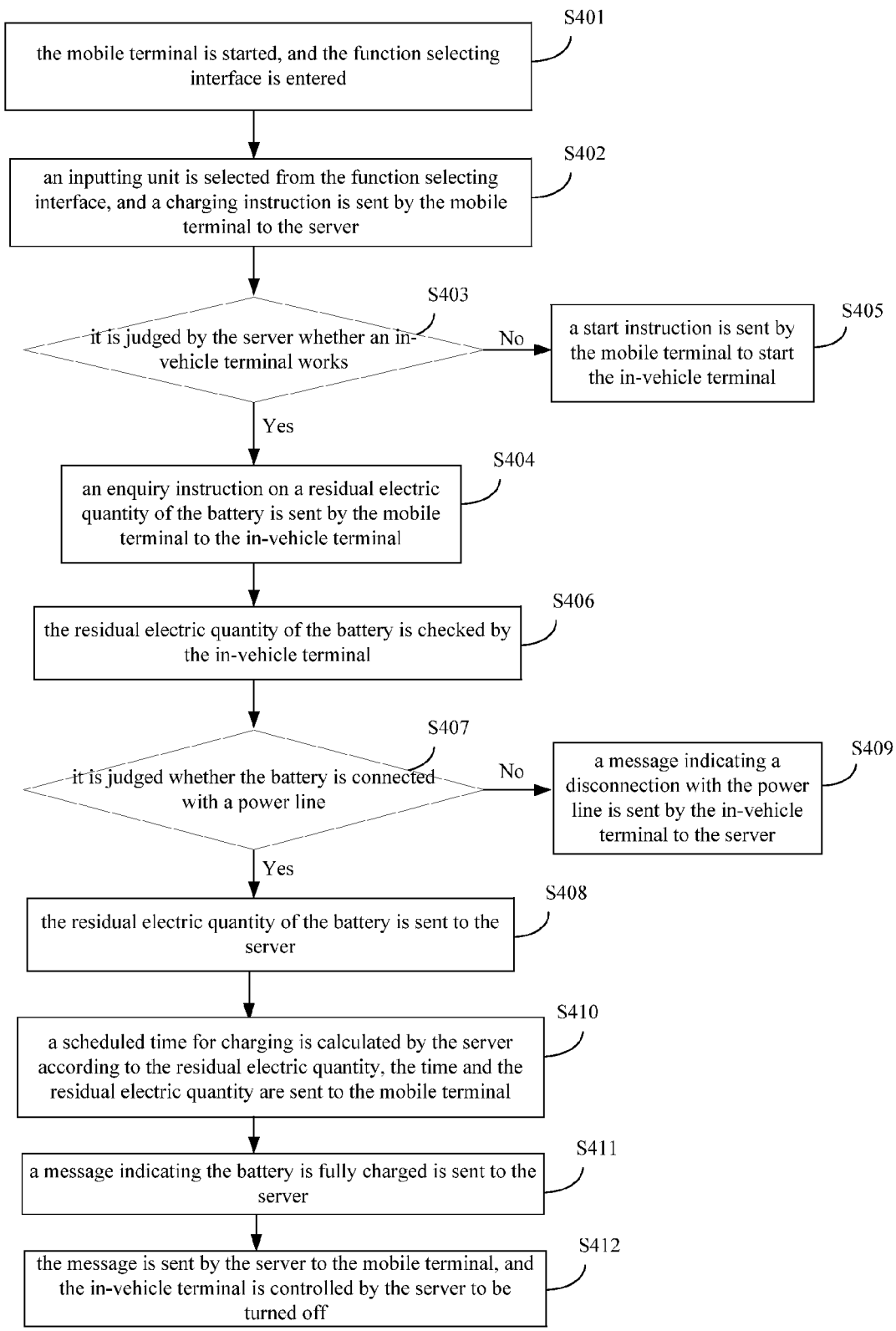
FIG. 4 is a flow chart illustrating an exemplary charging operation for controlling charging a battery according to an embodiment of the present disclosure.

FIG. 4 is a flow chart illustrating an exemplary charging operation of the method above according to an embodiment of the present disclosure. As shown in FIG. 4, the charging operation comprises following steps.

At step S401, the mobile terminal is started, and the function selecting interface is entered.

At step S402, an inputting unit is selected from the function selecting interface, and a charging instruction is sent by the mobile terminal to the server.

At step S403, it is judged by the server whether an in-vehicle terminal works. If yes, step S404 follows; if no, step S405 follows.

At step S404, an enquiry instruction for a residual electric quantity of the battery is sent by the mobile terminal to the in-vehicle terminal.

At step S405, a start instruction is sent by the mobile terminal to start the in-vehicle terminal.

At step S406, the residual electric quantity of the battery is checked by the in-vehicle terminal.

At step S407, it is judged whether the battery is connected with a power line. If yes, step S408 is followed; if no, step S409 is followed.

At step S408, the residual electric quantity of the battery is sent to the server.

At step S409, a message indicating a disconnection with the power line is sent by the in-vehicle terminal to the server, and then is sent by the server to the mobile terminal so as to remind the user to connect the battery to the power line.

At step S410, a time needed for charging is calculated by the server according to the residual electric quantity, the time and the residual electric quantity are sent to the mobile terminal, and meanwhile, the battery is charged by the battery management device.

At step S411, when it is detected by the in-vehicle terminal that the battery is fully charged, a message indicating the battery is fully charged is sent to the server.

At step S412, the message is sent by the server to the mobile terminal, and the in-vehicle terminal is controlled by the server to be turned off.

In some embodiments, the method further comprises the following steps. The mobile terminal compares a preset low threshold price with the real-time electricity price, and provides a reminder to the user to charge the battery when the real-time electricity price is lower than the preset low threshold price. Particularly, the real-time electricity price is updated by the server between a certain interval, so as to keep the real-time electricity price refreshed.

Figure 5:
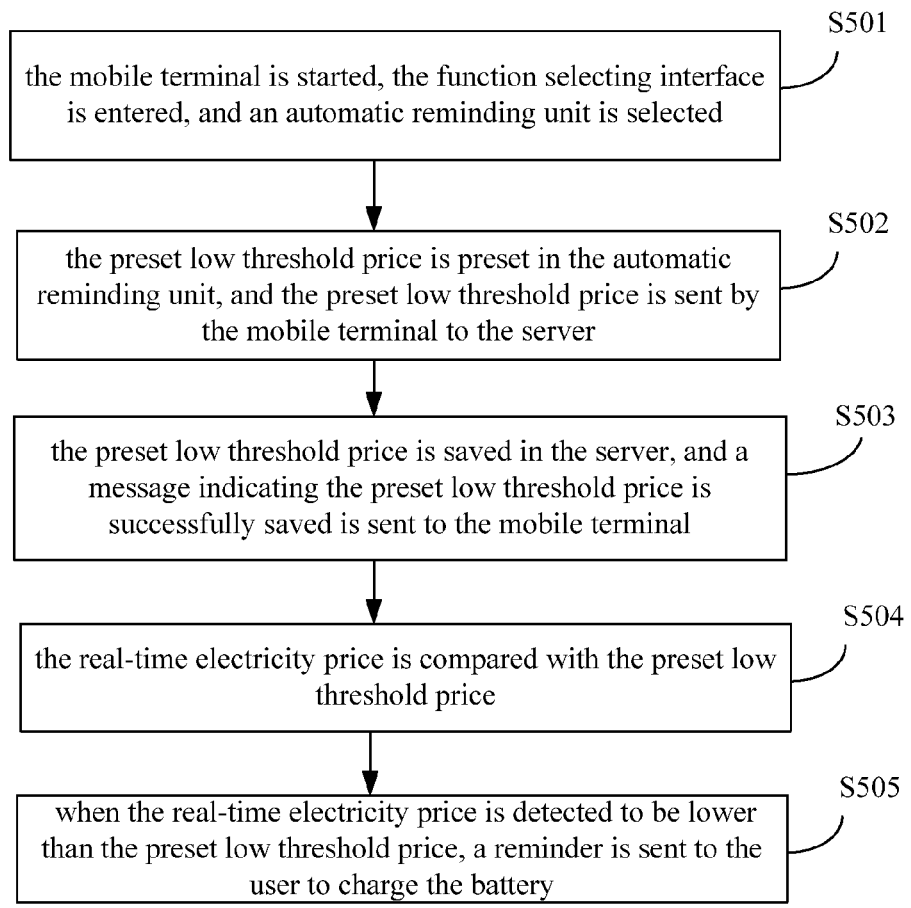
FIG. 5 is a flow chart illustrating an exemplary automatic reminding operation for controlling charging a battery according to an embodiment of the present disclosure.

FIG. 5 is a flow chart illustrating an exemplary automatic reminding operation according to embodiments of the present disclosure. As shown in FIG. 5, the automatic reminding operation comprises following steps.

At step S501, the mobile terminal is started, the function selecting interface is entered, and an automatic reminding unit is selected.

At step S502, the preset low threshold price is preset in the automatic reminding unit, and the preset low threshold price is sent by the mobile terminal to the server.

At step S503, the preset low threshold price is saved in the server, and a message indicating the preset low threshold price is successfully saved is sent by the server to the mobile terminal.

At step S504, the real-time electricity price is compared with the preset low threshold price.

At step S505, when the real-time electricity price is detected to be lower than the preset low threshold price, a reminder is sent to the user to charge the battery.

Figure 6:
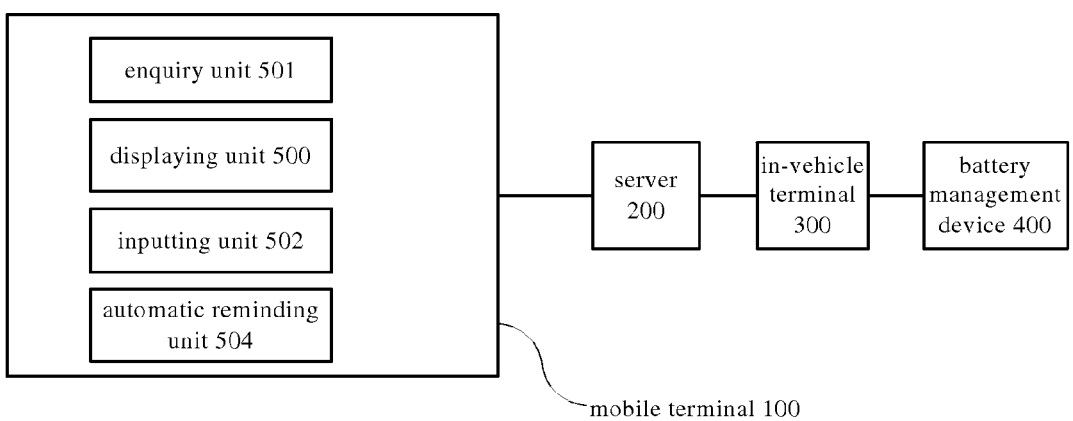
FIG. 6 is a schematic diagram of an exemplary system for controlling discharging a battery according to an embodiment of the present disclosure.

FIG. 6 is a schematic diagram of an exemplary system for controlling discharging a battery according to an embodiment of a third aspect of the present disclosure. As shown in FIG. 6, the system comprises a mobile terminal 100, a server 200 and a battery management device 400.

In some embodiments, the mobile terminal 100 comprises an enquiry unit 501, a displaying unit 500 and an inputting unit 502. The enquiry unit 501 is configured to send an enquiry instruction for a real-time electricity price to the server 200. The displaying unit 500 is configured to receive the real-time electricity price returned from the server 200 and to display the real-time electricity price to the user. The inputting unit 502 is configured to receive a discharging instruction from the user and to send the discharging instruction to the server 200. The server 200 is configured to provide the real-time electricity price to the mobile terminal 100 and to send the discharging instruction to the battery management device 400. The battery management device 400 is configured to control discharging the battery according to the discharging instruction.

In some embodiments, the battery may be an in-vehicle battery. Accordingly, the system may further comprise an in-vehicle terminal 300, located in an electric vehicle and configured to communicate with the server 200 and the battery management device 400. The in-vehicle terminal 300 is configured to receive an operation instruction from the server 200 and then control the battery management device 400 to work according to the operation instruction. For example, the in-vehicle terminal 300 may receive the discharging instruction from the server 200 and then control the battery management device 400 to discharge the in-vehicle battery. In some embodiments, the in-vehicle terminal 300 may receive an enquiry instruction for a residual electric quantity of the in-vehicle battery from the server 200, check the residual electric quantity of the in-vehicle battery, and then send the residual electric quantity to the server 200. The server 200 sends the residual electric quantity to the mobile terminal 100, which then sends a preset discharging limit according to the residual electric quantity to the server 200. The server 200 can judge a scheduled time for discharging, according to the discharging limit, and sends the time to the displaying unit 500.

In some embodiments, the mobile terminal 100 further comprises an automatic reminding unit 504. The automatic reminding unit 504 is configured to compare a preset high threshold price with the real-time electricity price, and to remind the user to discharge the battery when the real-time electricity price becomes higher than the preset high threshold price.

In some embodiments, the inputting unit 502 includes a one-touch key configured to receive user inputs when the one-touch key is touched.

Figure 7:
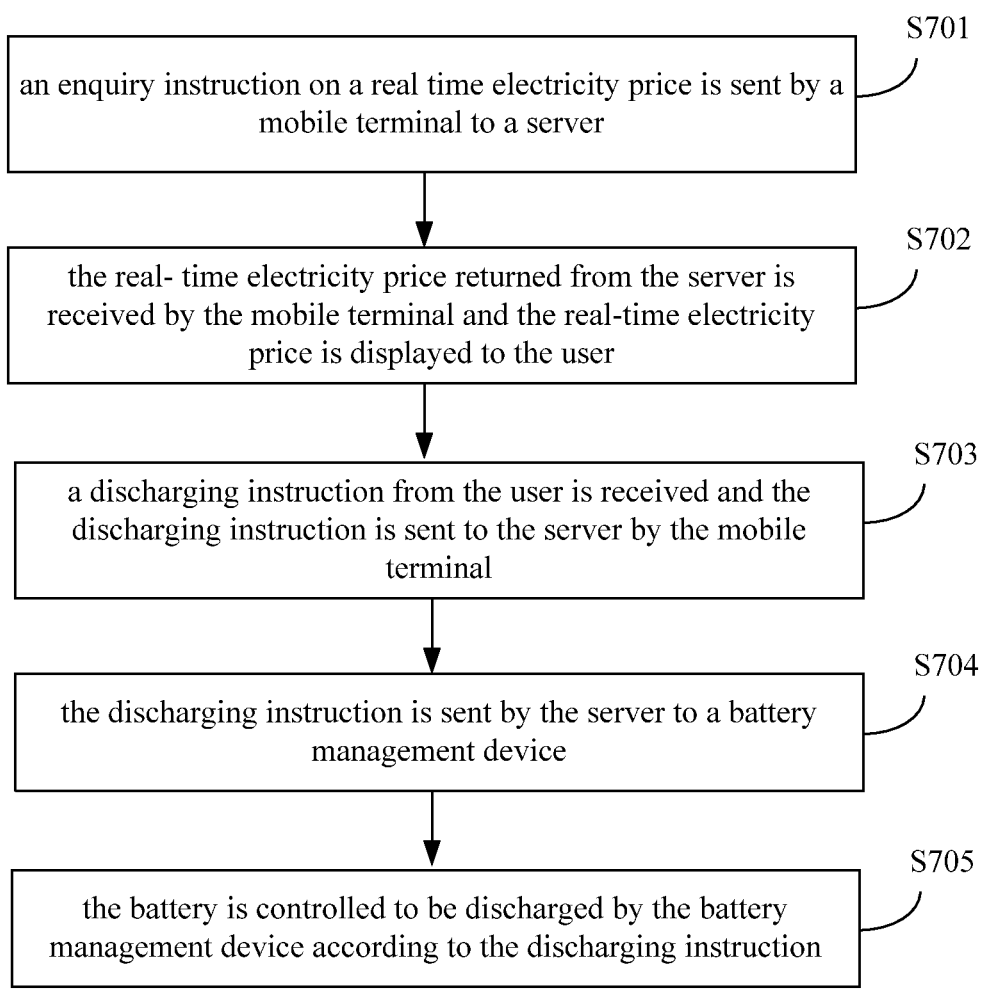
FIG. 7 is a flow chart illustrating an exemplary method for controlling discharging a battery according to an embodiment of the present disclosure.

A method for controlling discharging a battery according to an embodiment of a fourth aspect of the present disclosure is provided. As shown in FIG. 7, the method comprises the following steps.

At step S701, an enquiry instruction for a real-time electricity price is sent by a mobile terminal to a server.

At step S702, the real-time electricity price returned from the server is received by the mobile terminal, and the real-time electricity price is displayed to the user.

At step S703, a discharging instruction from the user is received and the discharging instruction is sent to the server by the mobile terminal. In some embodiments, the mobile terminal receives discharging instruction from the user, via an input unit thereof, if the user determines to discharge the battery according to the real-time electricity price.

At step S704, the discharging instruction is sent by the server to a battery management device.

At step S705, the battery is controlled to be discharged by the battery management device according to the discharging instruction.

The enquiry operation for discharging the battery can be the same as that for charging the battery, which is described with reference to FIG. 3 above and will not be described in detail here.

In some embodiments, in order to inform the user an electric quantity of the battery and to enable a discharging process to be visually controllable, the method may further comprise the following steps. The server sends to the battery management device an enquiry instruction for a residual electric quantity of the battery. The battery management device checks the residual electric quantity of the battery. The server receives the residual electric quantity from the battery management device. The server sends the received residual electric quantity to the mobile terminal. The server then receives a discharging limit set according to the residual electric quantity a mobile terminal. The server then judges a scheduled time for discharging according to the discharging limit, and sends the time to the mobile terminal.

In some embodiments, in order to inform the user of a termination of the discharging, the method may further comprise the following steps. The server receives, from the battery management device, a message indicating the battery is discharged. The server then sends the message to the mobile terminal, to inform the user about the discharging process in time.

Figure 8:
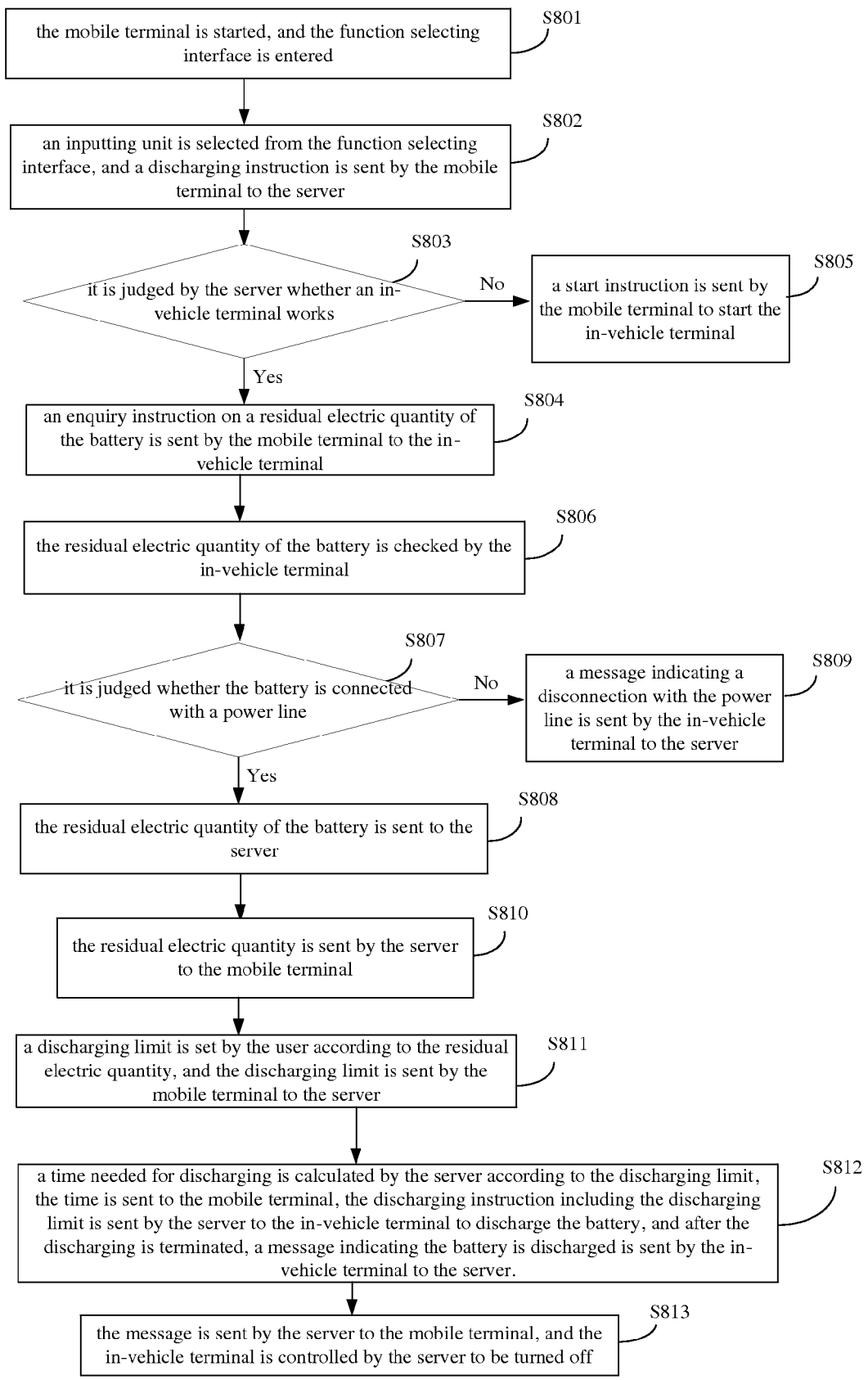
FIG. 8 is a flow chart illustrating an exemplary discharging operation for controlling discharging a battery according to an embodiment of the present disclosure.

FIG. 8 is a flow chart illustrating an exemplary discharging operation for controlling discharging the battery according to an embodiment of the present disclosure. As shown in FIG. 8, the discharging operation comprises following steps.

At step S801, the mobile terminal is started, and the function selecting interface is entered.

At step S802, an inputting unit is selected from the function selecting interface, and a discharging instruction is sent by the mobile terminal to the server.

At step S803, it is judged by the server whether an in-vehicle terminal works. If yes, step S804 is followed; if no, step S805 is followed.

At step S804, an enquiry instruction on a residual electric quantity of the battery is sent by the mobile terminal to the in-vehicle terminal.

At step S805, a start instruction is sent by the mobile terminal to start the in-vehicle terminal.

At step S806, the residual electric quantity of the battery is checked by the in-vehicle terminal.

At step S807, it is judged whether the battery is connected with a power line. If yes, step S808 is followed; if no, step S809 is followed.

At step S808, the residual electric quantity of the battery is sent to the server.

At step S809, a message indicating a disconnection with the power line is sent by the in-vehicle terminal to the server, and then is sent by the server to the mobile terminal so as to remind the user to connect the battery to the power line.

At step S810, the residual electric quantity is sent by the server to the mobile terminal.

At step S811, the server receives a discharging limit calculated according to the residual electric quantity from the mobile terminal.

At step S812, a time needed for discharging is calculated by the server according to the discharging limit, the time is sent to the mobile terminal, the discharging instruction including the discharging limit is sent by the server to the in-vehicle terminal to discharge the battery. After the discharging is terminated, a message indicating the battery is discharged is sent by the in-vehicle terminal to the server.

At step S813, the message is sent by the server to the mobile terminal, and the in-vehicle terminal is controlled by the server to be turned off.

In some embodiments, the method for controlling discharging the battery further comprises the following steps. The mobile terminal compares a preset high threshold price with the real-time electricity price by the mobile terminal. The mobile terminal then provides a reminder to the user to discharge the battery when the real-time electricity price becomes higher than the preset high threshold price. In some embodiments, the server updates the real-time electricity price between a certain interval, so as to provide up-to-date real-time electricity price. With the method according to embodiments of the present disclosure, when the electricity price is relative higher, the power can be released, by discharging the battery, back to a power grid, which can help maximizing a benefit; in another aspect, the operation is simplified by automatically reminding of the higher real-time electricity price.

Figure 9:
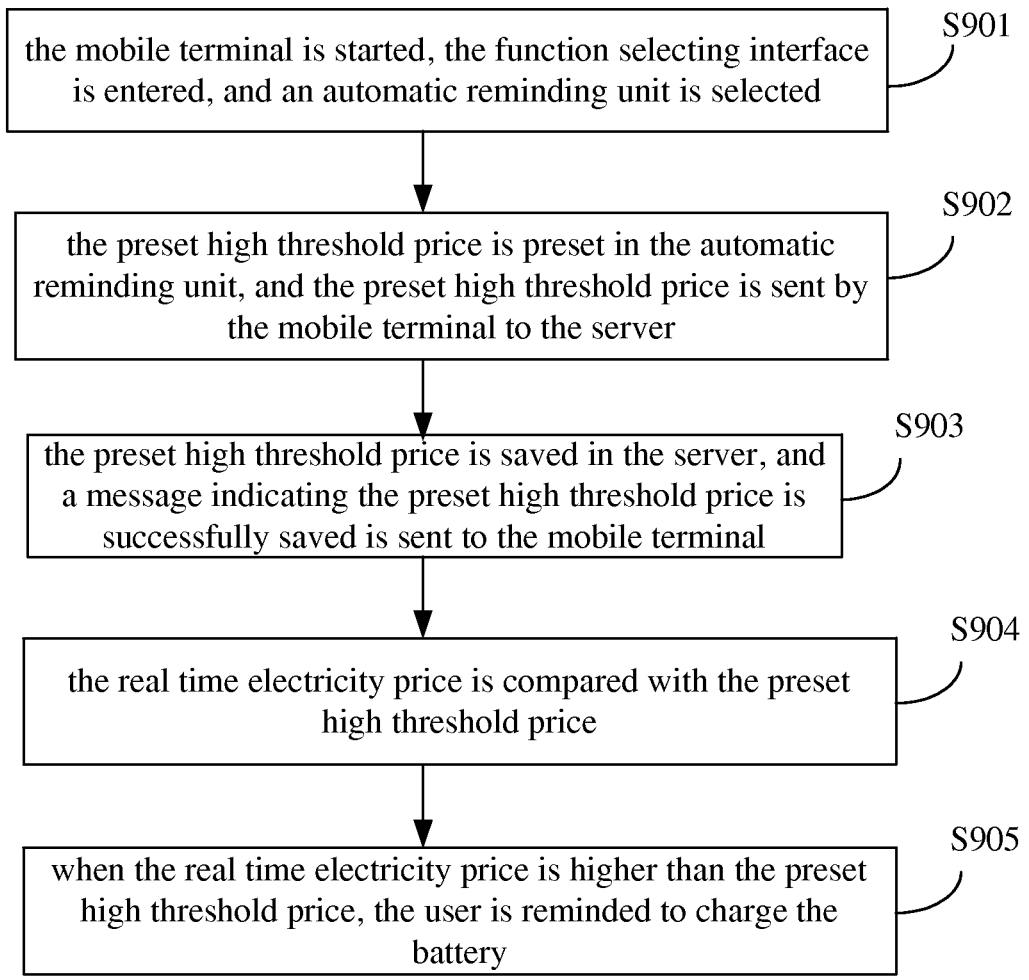
FIG. 9 is a flow chart illustrating an exemplary automatic reminding operation for controlling discharging a battery according to an embodiment of the present disclosure.

FIG. 9 is a flow chart illustrating an exemplary automatic reminding operation for controlling discharging the battery according to an embodiment of the present disclosure. As shown in FIG. 9, the automatic reminding operation comprises the following steps.

At step S901, the mobile terminal is started, the function selecting interface is entered, and an automatic reminding unit is selected.

At step S902, the preset high threshold price is preset in the automatic reminding unit, and the preset high threshold price is sent by the mobile terminal to the server.

At step S903, the preset high threshold price is saved in the server, and a message indicating the preset high threshold price is successfully saved is sent to the mobile terminal.

At step S904, the real-time electricity price is compared against the preset high threshold price.

At step S905, when the real-time electricity price becomes higher than the preset high threshold price, a reminder is sent to the user to charge the battery.

In above embodiments of the method for controlling charging or discharging the battery group, in order to provide reliable information exchange between the server and the mobile terminal or between the server and the in-vehicle terminal, a method for receiving and sending information between the server and the mobile terminal (or the in-vehicle terminal) is provided as following.

When a server receives an instruction from the mobile terminal or from the in-vehicle terminal, the server sends a response to the mobile terminal (or the in-vehicle terminal). If the response is not received by the mobile terminal (or the in-vehicle terminal) in a preset time, the mobile terminal or the in-vehicle terminal will resend the instruction. Similarly, when the mobile terminal (or the in-vehicle terminal) receives an instruction from the server, the mobile terminal (or the in-vehicle terminal) sends a response back to the server; if the response is not received by the server in a preset time, the server resends the instruction to the mobile terminal (or the in-vehicle terminal).

According to embodiments of the present disclosure, the mobile terminal 100 can send the instruction to the server 200 wirelessly. The server 200 can also send the instruction to the in-vehicle terminal 300 wirelessly, while the in-vehicle terminal 300 can communicate with the battery management device 400 via CAN.

Figure 10:
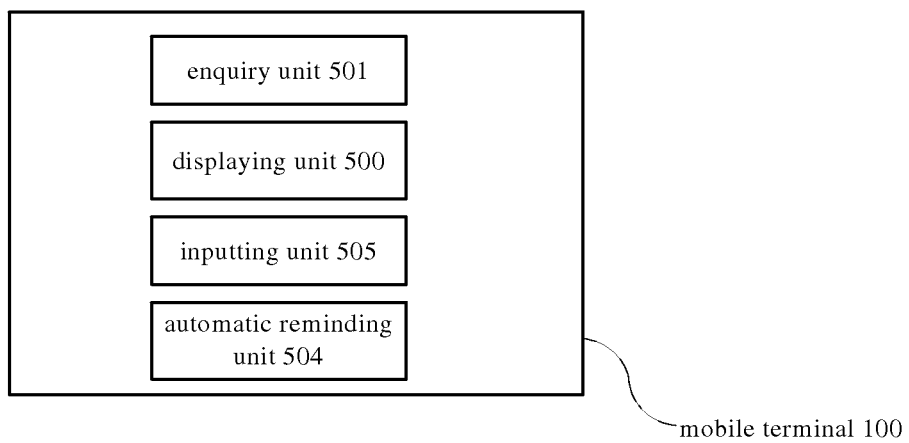
FIG. 10 is a schematic diagram of an exemplary mobile terminal for controlling charging and discharging a battery according to an embodiment of the present disclosure.

Further, an exemplary mobile terminal for controlling charging and discharging a battery is provided according to embodiments of the present disclosure. As shown in FIG. 10, in some embodiments, the mobile terminal 100 comprises an enquiry unit 501, a displaying unit 500 and an inputting unit 505. The enquiry unit 501 is configured to send an enquiry instruction for a real-time electricity price to a server. The displaying unit 500 is configured to receive the real-time electricity price from the server in return, and to display the received real-time electricity price to a user. The inputting unit 505 is configured to receive a charging instruction or a discharging instruction from the user, and to send the received charging instruction or the discharging instruction to the server.

In some embodiments, the mobile terminal 100 further comprises an automatic reminding unit 504. The automatic reminding unit 504 can be configured to, for example, compare a preset high threshold price with the real-time electricity price, and to remind the user to discharge the battery when the real-time electricity price becomes higher than the preset high threshold price. In some embodiments, the automatic reminding unit 504 can also be configured to compare a preset high threshold price with the real-time electricity price, and to remind the user to discharge the battery back to the power grid when the real-time electricity price is higher than the preset high threshold price.

In some embodiments, the inputting unit 505 comprises a one-touch key, and receives charging and/or discharging instructions from the user by detecting touches via the one-touch key. In some embodiments, the inputting unit 505 may comprise two one-touch keys, one for receiving charging instruction and the other one for receiving discharging instruction. It should be understood that, the one-touch key mode described herein is explanatory and illustrative, and shall not be construed to limit the present disclosure.

In some embodiments, the battery is an in-vehicle battery.

In some embodiments, the displaying unit 500 is further configured to display a residual electric quantity of the battery from the server. In some embodiments, the inputting unit 505 is further configured to transmit a discharging limit calculated according to the residual electric quantity to the server, and the server is configured to judge a scheduled time for discharging based on the discharging limit, and then send the time to the displaying unit 500.

In some embodiments, the mobile terminal 100 may comprise any mobile communication tool, such as a smart phone or a tablet PC. In one embodiment, the mobile terminal 100 is the smart phone which sends an operation instruction to the server 200 via a wireless network.

With the system for controlling charging the battery and the system for controlling discharging the battery according to embodiments of the present disclosure, with the enquiry unit, the user gets the real-time electricity price in time. With the inputting unit, instructions can be sent conveniently to charge or discharge the battery. With the automatic reminding unit, user can be reminded to charge the battery when the real-time electricity price is below a preset low threshold price, so as to save a charge cost; and when the real-time electricity price is higher than the preset high threshold price, the user can be reminded to discharge the battery to a power grid so as to maximize a use's benefit. The user also needs not check the real-time electricity price frequently.

With the method for controlling charging the battery and the method for controlling discharging the battery according to embodiments of the present disclosure, by enquiring the real-time electricity price, the user gets the real-time electricity price in time. Accordingly, the battery may be charged when the real-time electricity price is relatively lower so as to save the charge cost, and the battery may be discharged when the real-time electricity price is relatively higher so as to maximize the use's benefit. Furthermore, by setting the preset low threshold price and the preset high threshold price, the user may be automatically reminded to charge the battery when the real-time electricity price is lower than the preset low threshold price, and the user may be automatically reminded to discharge the battery when the real-time electricity price is higher than the preset high threshold price. In this way, the user does not need to check the real-time electricity price frequently.

With the system and the method for controlling charging the battery according to embodiments of the present disclosure, when the real-time electricity price is lower than the preset low threshold price, the user may be automatically reminded to charge the battery so as to save the charge cost. With the system and the method for controlling discharging the battery according to embodiments of the present disclosure, when the real-time electricity price is higher than the preset high threshold price, the user may be automatically reminded to discharge the battery to release the power back to the power grid, thus maximizing the use's benefit. Moreover, the systems and the methods are easy to operate.

Reference throughout this specification to "an embodiment", "some embodiments", "one embodiment", "an example", "a specific examples", or "some examples" means that a particular feature, structure, material, or characteristic described in connection with the embodiment or example is included in at least one embodiment or example of the disclosure. Thus, the appearances of the phrases such as "in some embodiments", "in one embodiment", "in an embodiment", "an example", "a specific examples", or "some examples" in various places throughout this specification are not necessarily referring to the same embodiment or example of the disclosure. Furthermore, the particular features, structures, materials, or characteristics may be combined in any suitable manner in one or more embodiments or examples.

Although explanatory embodiments have been shown and described, it would be appreciated by those skilled in the art that changes, alternatives, and modifications may be made in the embodiments without departing from spirit and principles of the disclosure. Such changes, alternatives, and modifications all fall into the scope of the claims and their equivalents.

What is claimed is:

1. A server for controlling charging and discharging of battery, the server being configured to:
   obtain electricity pricing information;
   provide the electricity pricing information to a mobile terminal;
   receive an instruction from the mobile terminal to charge or discharge a battery, the instruction being generated according to the electricity pricing information; and
   provide the instruction to a battery management device to charge or discharge the battery,
   receive information about a residual electric quantity of the battery from the battery management device;
   provide the received information about the residual electric quantity to the mobile terminal;
   receive information about a discharging limit from the mobile terminal, the discharging limit being calculated according to the residual electric quantity; and
   calculate a time scheduled for discharging the battery based on the received information about the discharging limit;
   wherein the instruction provided to the battery management device includes the discharging limit.

2. The server of claim 1, further configured to:
   receive information about a residual electric quantity of the battery from the battery management device;
   calculate a time scheduled for charging the battery based on the received information about the residual electric quantity; and
   provide a message to the mobile terminal to indicate that the battery is fully charged.

3. A mobile terminal for controlling charging and discharging of battery, comprising:
   an enquiry unit configured to send an enquiry instruction for information about electricity price to a server;
   a displaying unit configured to receive the information about electricity price from the server and to display the electricity pricing information; and
   an inputting unit configured to receive an instruction to charge or discharge a battery and to send the instruction to the server, the instruction allowing the server to control a battery management device to charge or discharge the battery according to the instruction.

4. The mobile terminal according to claim 3, wherein the inputting unit comprises a one-touch key.

5. The mobile terminal according to claim 3, further comprising a reminding unit configured to:
   compare a first threshold price with the received electricity price; and
   provide a reminder to the user to charge the battery when the received electricity price is lower than the first threshold price.

6. The mobile terminal according to claim 3, further comprising a reminding unit configured to:
   compare a second threshold price with the received electricity price; and
   provide a reminder to the user to discharge the battery when the received electricity price is higher than the second threshold price.

7. The mobile terminal according to claim 3, wherein:
   the displaying unit is further configured to display a residual electric quantity of the battery acquired from the server;
   the inputting unit is further configured to transmit a discharging limit calculated according to the residual electric quantity to the server and receive a scheduled time for discharging the battery from the server, the scheduled time being calculated according to the discharging limit; and
   the displaying unit is further configured to display the scheduled time.

* * * * *